(12) United States Patent
Gremaud et al.

(10) Patent No.: US 7,273,520 B2
(45) Date of Patent: Sep. 25, 2007

(54) INK SET FOR INK JET PRINTING

(75) Inventors: Jean-Luc Gremaud, Farvagny (CH); Arnd Kriebel, Marly (CH)

(73) Assignee: ILFORD Imaging Switzerland GmbH (CH)

( * ) Notice: Subject to any disclaimer, the term of this patent is extended or adjusted under 35 U.S.C. 154(b) by 0 days.

(21) Appl. No.: 11/044,281

(22) Filed: Jan. 27, 2005

(65) Prior Publication Data
US 2005/0160937 A1 Jul. 28, 2005

(30) Foreign Application Priority Data
Jan. 28, 2004 (EP) .................. 04405051

(51) Int. Cl.
*C09D 11/00* (2006.01)
*C09D 11/02* (2006.01)

(52) U.S. Cl. .............................. 106/31.48; 106/31.51; 106/31.49; 106/31.5; 106/31.52

(58) Field of Classification Search ............ 106/31.48, 106/31.49, 31.5, 31.51, 31.52
See application file for complete search history.

(56) References Cited

U.S. PATENT DOCUMENTS

| 5,969,115 | A | 10/1999 | Peter | |
|---|---|---|---|---|
| 6,053,969 | A | 4/2000 | Lauw et al. | |
| 6,068,687 | A * | 5/2000 | Baettig et al. | 106/31.48 |
| 6,514,329 | B1 * | 2/2003 | Carr et al. | 106/31.48 |
| 6,517,620 | B1 * | 2/2003 | Carr et al. | 106/31.48 |
| 6,521,032 | B1 | 2/2003 | Lehmann et al. | |
| 6,843,838 | B2 * | 1/2005 | Zimmer et al. | 106/31.27 |
| 6,867,286 | B1 * | 3/2005 | Holloway et al. | 534/797 |
| 2002/0121221 | A1 | 9/2002 | Baettig | |
| 2005/0011406 | A1 * | 1/2005 | Kabalnov et al. | 106/31.49 |
| 2005/0211134 | A1 * | 9/2005 | Gremaud et al. | 106/31.48 |

FOREIGN PATENT DOCUMENTS

| CH | 0 692 580 A5 | 8/2002 |
|---|---|---|
| EP | 0 755 984 A1 | 1/1997 |
| EP | 0 859 033 A1 | 8/1998 |
| EP | 0 924 263 A1 | 6/1999 |
| EP | 0 982 371 A1 | 3/2000 |
| EP | 1 086 999 A2 | 3/2001 |
| EP | 1 086 999 A3 | 3/2001 |
| EP | 1 219 682 A1 | 7/2002 |
| EP | 1 308 490 A1 | 5/2003 |
| WO | WO96/24636 | 8/1996 |

OTHER PUBLICATIONS

"Color Science : Concepts and Methods, Quantitative Data and Formulae" Wiley-Interscience, ISBN 0-471-02106-7, 165-169 (1982), no month avail.

* cited by examiner

*Primary Examiner*—Helene Klemanski
(74) *Attorney, Agent, or Firm*—Onofrio Law; Dara L. Onofrio, Esq.

(57) ABSTRACT

Ink set for ink jet printing comprised of at least one yellow ink, one magenta ink, one cyan ink and one black ink, wherein the yellow ink contains a mixture of at least one yellow dye with reddish hue of formula (I),

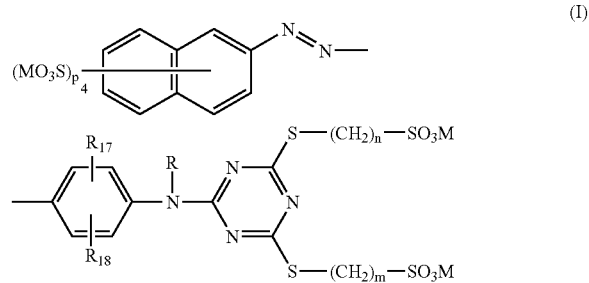

(I)

wherein R, M, $R_{17}$, $R_{18}$, $p_4$, n and m are as defined in the specification and
at least one yellow dye with greenish hue of formula (II),

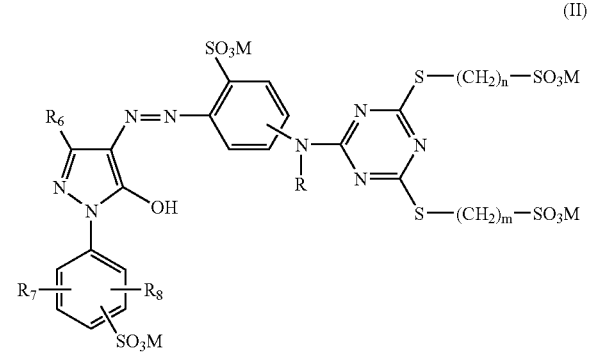

(II)

wherein R, M, $R_6$, $R_7$, $R_8$, n and m are as defined in the specification.

9 Claims, No Drawings

INK SET FOR INK JET PRINTING

FIELD OF THE INVENTION

The present invention relates to aqueous ink sets for ink jet printing comprising mixtures of yellow dyes of greenish hue and reddish hue in the yellow inks.

BACKGROUND OF THE INVENTION

Ink jet printing has already replaced or supplemented in many fields classic image reproduction methods such as photography on silver halide materials, off-set printing and screen printing. It is used in office surroundings, in the photographic field, in the graphic field, especially in proofing, and, generally, in the production of colored textile materials or in industrial environments. In ink jet printing, extremely small ink droplets are expelled through the nozzles of a printing head and are deposited on a recording medium, using digital image data. The inks used therein consist of solutions or dispersions of colored or black dyes or pigments in a liquid vector. The liquid vector consists, depending on the type of the dye or the pigment, of water, mixtures of water with water-miscible organic solvents, mixtures of exclusively organic solvents, of oils or hydrophobic organic solvents.

Ink jet printing has attained a remarkable degree of maturity. For very demanding applications in the graphic field and the photographic field, however, further improvements are necessary. In these fields, the light stability and the volume of the color space (gamut) are extremely important. Both properties are crucially influenced by the constitution of the dyes or pigments that are used. Pigments normally show a better light stability than soluble dyes. In most cases, however, dyes have a higher brilliance and therefore show more brilliant colors. Furthermore, pigments have a tendency to stay on the surface of the printed medium and therefore to reduce the gloss of the surface. This is not desirable especially for photographic applications of ink jet printing.

Up to now, dye based inks provide a better reproduction of brilliant colors. For applications where a high brilliance of the colors is needed, inks containing dyes and not pigments are preferentially used. Generally, the use of dye-based inks also gives a cost advantage, because in most cases dyes are cheaper than pigments.

In ink sets for demanding applications such as in the graphic field, in photography or in proofing applications, the most brilliant available dyes are used. These dyes must show, besides good water fastness and high diffusion fastness, an excellent light stability.

The simplest ink set consists of one yellow ink, one magenta ink, one cyan ink and one black ink. The three colored inks (primary colors) allow, by superposition, the reproduction of the secondary colors such as red, blue and green and of all intermediate colors.

Inks for ink jet printing need to satisfy stringent requirements. They need to show excellent properties with regard to chemical and physical stability, toxicity and rheology. They are allowed neither to corrode the constituents of the printing heads, nor to clog the nozzles or to form deposits on the heating elements of thermal printing heads. On the recording sheets, however, the inks need to dry quickly and the dyes are, for example, not allowed to diffuse, they need to be light stable and they are not allowed to deteriorate or bleach when the printed images are stored in contaminated air. Furthermore, they are not allowed to reduce the gloss of the recording sheets or to disturb the process of lamination of such printed recording sheets. The choice of suitable dyes for high quality ink jet printing is strongly limited by these requirements. Only a few of all the known dyes more or less fulfill all the requirements of high quality ink jet printing. Probably no dye exists that fulfills all these requirements completely.

Yellow dyes with reddish hue, as described for example in patent application EP 0,755,984, show an excellent light stability as well as an excellent brilliance and are therefore very suitable for the perfect reproduction of skin tones in ink jet printing of photographic quality. Furthermore, these dyes show a very good diffusion fastness.

In graphic applications, as for example in proofing, these yellow dyes with reddish hue are normally not used. Acid Yellow 23 of formula has exactly the

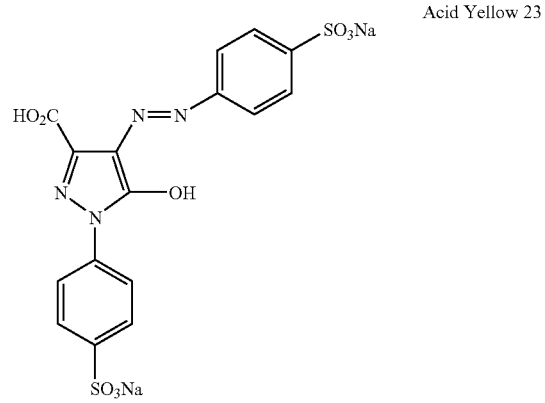

correct hue and is therefore the most suitable and normally used yellow dye in graphic applications, particularly in proofing. This dye has the disadvantages of bad light stability and bad diffusion fastness on nearly all recording sheets, as well on polymer based recording sheets and on nanoporous recording sheets. Only on uncoated paper its diffusion fastness is acceptable.

SUMMARY OF THE INVENTION

An objective of the invention is to provide ink sets with improved yellow inks for graphic applications in the case where polymer based recording sheets or nanoporous recording sheets are used. This objective is attained with yellow inks containing suitable mixtures of yellow dyes with greenish hue and with reddish hue.

Dyes very often are characterized by their position in color space. Normally the CIE (L*a*b*) system of 1976 is used. A definition is given for example on pages 164 to 169 and 829 of the book by G. Wyszecki and W. S. Stiles, "Color Science: Concepts and Methods, Quantitative Data and Formulae", 2nd edition, Wiley-Interscience (1982), ISBN 0-471-02106-7. This system will be used in the following parts of the description of the invention.

Yellow dyes with greenish hue are yellow dyes where the value of a* of the color coordinates is more negative than the corresponding value of Acid Yellow 23 if they are deposited on the same recording sheet at the same value of L*. Yellow dyes with reddish hue are yellow dyes where the value of a* of the color coordinates is more positive than the corresponding value of Acid Yellow 23 if they are deposited on the same recording sheet at the same value of L*.

Such mixtures are very well suited for the reproduction of the hue of Acid Yellow 23. They show, however, a marked improvement in dye diffusion and a light stability improvement by a factor of three to five. The yellow dyes used in the yellow inks according to the invention show considerably better properties with regard to diffusion fastness and light stability than the dye Acid Yellow 23.

The mixing ratio of the yellow dye with greenish hue and the yellow dye with reddish hue is from 1:99 and 99:1. Within these mixing ratios all hues between the hues of the pure dyes may be attained. In order to simulate the hue of Acid Yellow 23, a "graphic" yellow dye with greenish hue having a more negative value of a* than that of Acid Yellow 23 is mixed with a "photographic" yellow dye with reddish hue having a more positive value of a* than that of Acid Yellow 23.

DETAILED DESCRIPTION OF THE INVENTION

The invention relates to ink sets for ink jet printing of colored images using commercially available ink jet printers such as desk top printers or wide format printers. All types of ink jet printers may be used, such as thermal ink jet printers (bubble jet), piezo printers or continuous ink jet printers.

Such ink sets consist of at least one yellow ink, one magenta ink, one cyan ink and one black ink. Inks with lower dye concentrations may be used in addition. This improves the reproduction of dark and light parts of the images. It is also possible to include inks having other colors in order to improve color reproduction.

In yellow inks for ink jet printing, yellow dyes having a good light stability are normally used.

The invention relates particularly to ink sets including yellow inks wherein a mixture of a "graphic" yellow dye with greenish hue and a "photographic" yellow dye with reddish hue and good light stability is used. These yellow inks according to the invention allow a very good reproduction of the hue of Acid Yellow 23 used in proofing applications, and show, at the same time, a very good light stability and a very good diffusion fastness.

Suitable dyes with reddish hue for the yellow inks of the ink sets according to the invention are described for example in patent application EP 0,755,984. Such yellow inks comprise at least one dye of general formula (I),

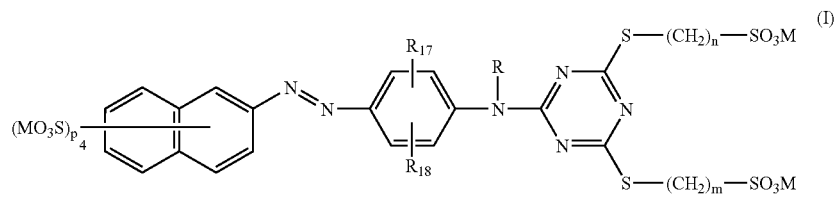

wherein

R represents hydrogen or alkyl having from 1 to 6 carbon atoms;

M represents hydrogen or a metal atom or ammonium optionally substituted by alkyl, alkoxyalkyl or hydroxyalkyl;

$R_{17}$, $R_{18}$ independently represent hydrogen, alkyl or alkoxy each having from 1 to 3 carbon atoms;

$p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5 in the case where $p_4$ is equal to 2; or the sulfo groups are in positions 3, 6 and 8 or 4, 6 and 8 in the case where $p_4$ is equal to 3 and n, m are each independently from 2 to 6.

Especially suitable are the yellow dye "Yellow R-1"

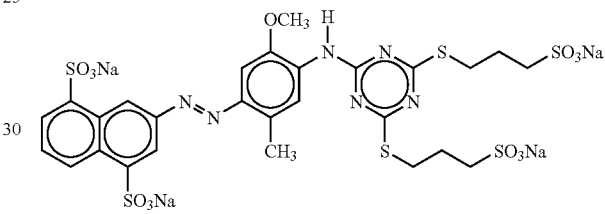

and the yellow dye "Yellow R-2"

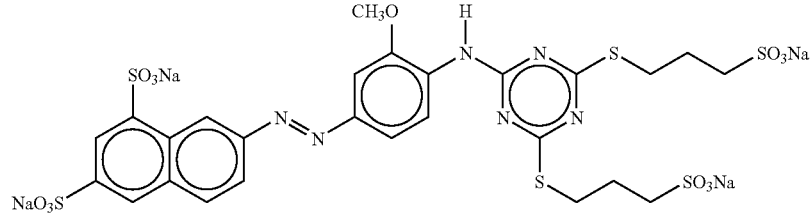

A mixture of yellow dyes with reddish hue of general formula (I) may also be used in the yellow inks according to the invention, particularly a mixture of the yellow dyes with reddish hue "Yellow R-1" and "Yellow R-2".

Suitable dyes with greenish hue for the yellow inks of the ink sets according to the invention are described for example in patent application EP 0,755,984. Such yellow inks comprise at least one dye of general formula (II),

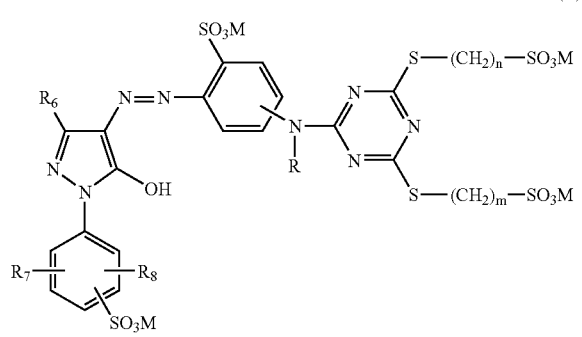

(II)

wherein

R represents hydrogen or alkyl having from 1 to 6 carbon atoms;

M represents hydrogen or a metal atom or ammonium optionally substituted by alkyl, alkoxyalkyl or hydroxyalkyl;

$R_6$ represents methyl or carboxy;

$R_7$, $R_8$ independently represent hydrogen, chloro, bromo or methyl and n, m are each independently from 2 to 6.

Especially preferred are the yellow dye "Yellow G-1" of formula

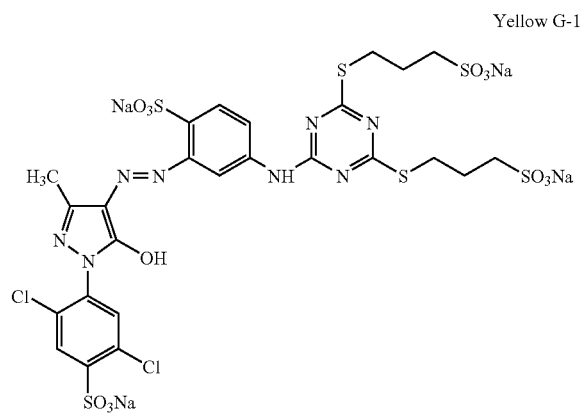

Yellow G-1 and the yellow dye "Yellow G-2" of formula

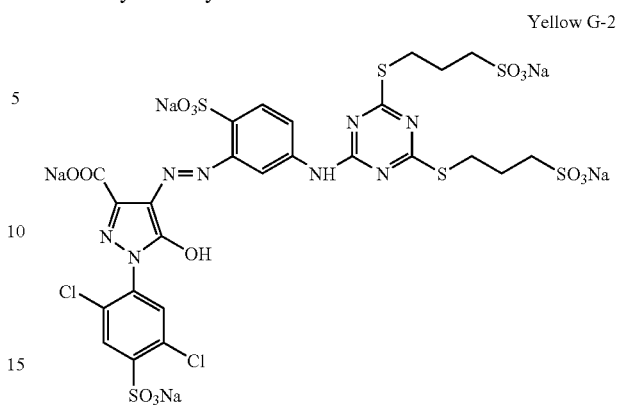

Yellow G-2

A mixture of yellow dyes with greenish hue of general formula (II) may also be used in the yellow inks according to the invention, in particular a mixture of the yellow dyes with greenish hue "Yellow G-1" and "Yellow G-2".

Ink sets comprising, in the yellow ink, a mixture of at least one yellow dye with reddish hue and at least one yellow dye with greenish hue, show, together with the magenta ink, the cyan ink and the black ink, very brilliant green, yellow and red colors with improved light stability and excellent diffusion behavior in comparison with an ink set which comprises the dye Acid Yellow 23 in the yellow ink.

In magenta inks for ink jet printing, azo dyes such as metal free azo dyes with an incorporated γ-acid moiety or a H-acid moiety in the chromophore or copper complex azo dyes are generally used.

Suitable dyes for the magenta ink of the ink sets according to the invention are described for example in patent applications WO 96/24,636, EP 1,086,999 and EP 1,219,682.

Especially preferred dyes are the dye "Magenta 1" of formula

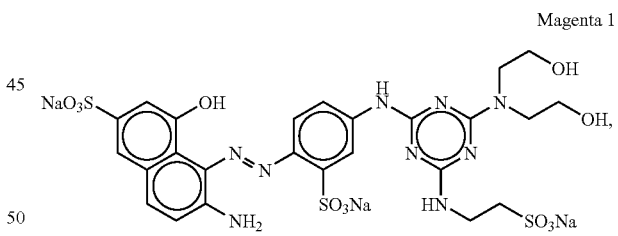

Magenta 1 the dye "Magenta 2" of formula

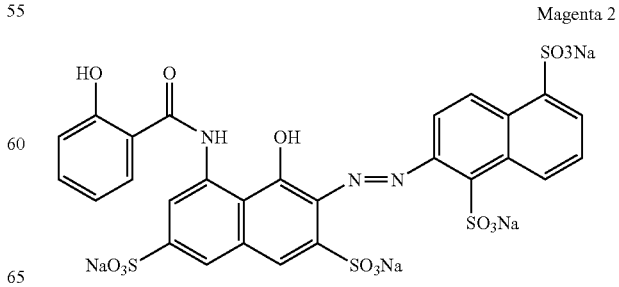

Magenta 2 and the dye "Magenta 3" of formula

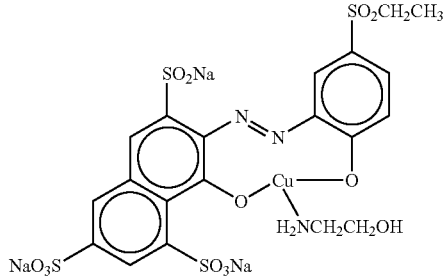

Magenta 3

Especially preferred is an ink set consisting of a yellow ink, a magenta ink, a cyan ink and a black ink, which comprises, in the yellow ink, a mixture of a yellow dye with reddish hue of formula (I) and a yellow dye with greenish hue of formula (II) and in the magenta ink one of the dyes "Magenta 1", "Magenta 2" or "Magenta 3" or a mixture of these dyes.

In cyan inks for ink jet printing, copper phthalocyanine dyes are generally used.

An especially preferred dye for the cyan ink of the ink sets according to the invention is the dye "Direct Blue 199" of formula

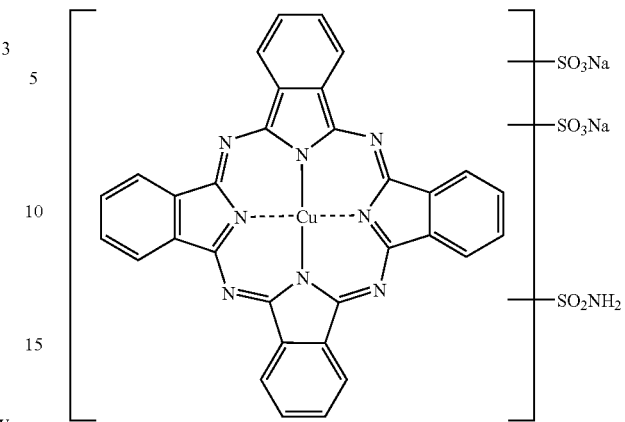

Direct Blue 199

Differently substituted copper phthalocyanine dyes, with different numbers and positions of the substituents in the molecule, may also be used.

Especially preferred is an ink set consisting of a yellow ink, a magenta ink, a cyan ink and a black ink, which comprises, in the yellow ink, a mixture of a yellow dye with reddish hue of formula (I) and a yellow dye with greenish hue of formula (II) and in the cyan ink the dye "Direct Blue 199".

Suitable dyes for the black ink of the ink sets according to the invention are described for example in patent applications EP 0,859,033, EP 0,924,263 and EP 0,982,371 and in patent CH 692,580.

Especially preferred are the dyes "Black 1" of formula

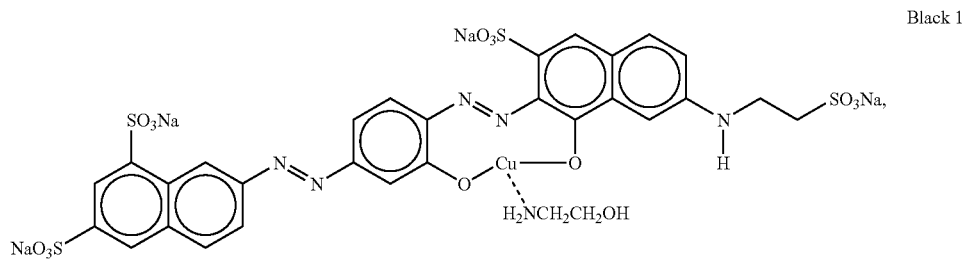

Black 1 the dye "Black 2" of formula

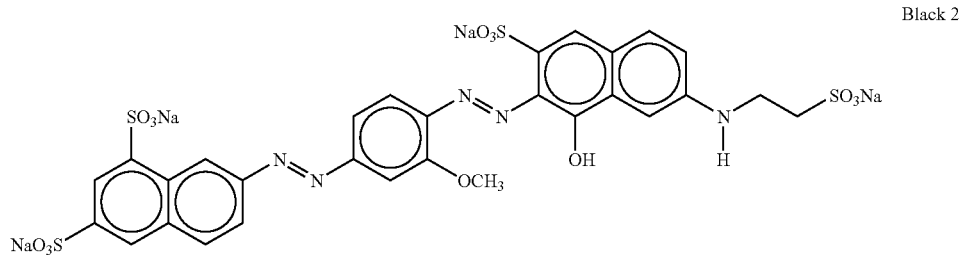

Black 2 and the dye "Reactive Black 31" of formula

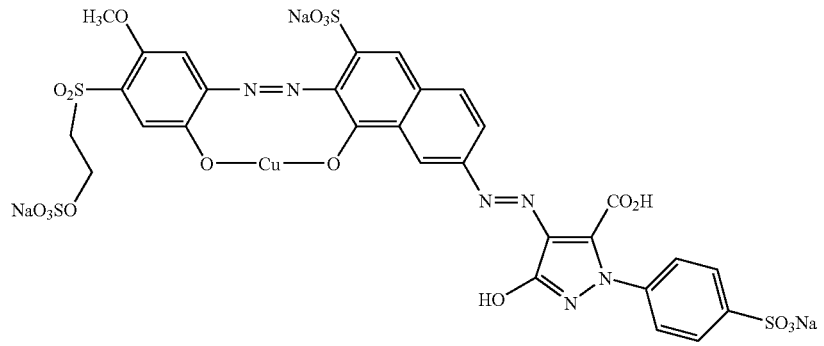

Reactive Black 31

Especially preferred is an ink set consisting of a yellow ink, a magenta ink, a cyan ink and a black ink, which comprises, in the yellow ink, a mixture of a yellow dye with reddish hue of formula (I) and a yellow dye with greenish hue of formula (II) and in the black ink one of the dyes "Black 1", "Black 2" or "Reactive Black 31" or a mixture of these dyes.

Ink sets consisting of a yellow ink, a magenta ink, a cyan ink and a black ink, which comprise, in the yellow ink, a mixture of at least one yellow dye with reddish hue and at least one yellow dye with greenish hue, show, together with the magenta ink, the cyan ink and the black ink, very brilliant green, yellow and red colors with improved light stability and excellent diffusion behavior in comparison with an ink set which comprises the dye Acid Yellow 23 in the yellow ink.

Recording sheets for high quality ink jet printing generally consist of a support such as for example polyethylene coated paper or voided polyester, into which has been coated an ink-receiving layer on the front side and, optionally, a backing layer improving the planarity on the back side.

In polymer based recording sheets the ink-receiving layer very often consists of a mixture of polymers such as polyvinyl pyrrolidone or carboxymethyl cellulose or of a mixture of these polymers with gelatin. Inks are absorbed relatively slowly into the ink-receiving layer, because absorption depends on the swelling of the ink-receiving layer. These recording sheets are not really suited for photofinishing applications, because this application requires quick drying of the printed recording sheet.

Recording sheets with ink-receiving layers containing nanocrystalline, nanoporous inorganic compounds are better suited for photofinishing applications. In these recording sheets, the deposited ink is absorbed by capillary forces of the nanocrystalline, nanoporous inorganic compounds such as for example AlOOH or $SiO_2$. For ink absorption, the ink-receiving layers do not need to swell.

The yellow inks according to the invention as well as the corresponding ink sets give excellent results on polymer based recording sheets as well as on nanoporous recording sheets.

The inks according to the invention contain, as usual, in addition to the principal component water, water-soluble organic solvents. Such a solvent needs to be compatible with the dyes and the other ingredients of the inks. Neither precipitates are allowed to form nor chemical reactions are allowed to occur. The solvents may be used as single entities or as mixtures. Inks containing the smallest number of different solvents are preferred. These solvents may be present in the inks in amounts up to 80 percent by weight relative to the total weight of the inks. Amounts as low as possible, up to 30 percent by weight, are preferred in order not to influence drying or dye diffusion behavior negatively. Suitable solvents are for example water-soluble alcohols, water-soluble glycols, higher alcohols, polyalcohols, diglycols, triglycols and polyglycols as well as monoethers and diethers of these compounds and nitrogen containing solvents such as ethanolamine, diethanolamine, diethanolamine, 2-pyrrolidone, octylpyrrolidone, N-methyl-pyrrolid-2-one or 1,3-dimethylimidazolid-2-one.

The inks according to the invention further contain so-called humefactants. Humefactants are organic, water-soluble liquids with high boiling points. They prevent that the ink dries at the nozzles of the printing head when printing is interrupted for long times. Nearly all solvents with high boiling point mentioned in the preceding paragraph may be used. Glycerol, in amounts of up to 30 percent by weight relative to the total weight of the inks, is preferred. Especially preferred are amounts up to 15 percent by weight.

The inks according to the invention may further contain metal chelating compounds. These metal chelating compounds may be contained in the inks in amounts up to 0.5 percent by weight relative to the total weight of the inks. Preferred are amounts up to 0.3 percent by weight. Ethylene diaminetetraacetic acid and its salts is an example of such a metal chelating compound.

The inks according to the invention may further contain non-ionic and/or anionic surfactants in order to adjust surface tension in the case where the presence of the solvent does not give the required value of surface tension. Cationic surfactants normally may not be used, because they would form precipitates with the anionic dyes. The non-ionic and/or anionic surfactants are preferentially added to the inks in amounts of up to 2 percent by weight relative to the total weight of the inks. Especially preferred are amounts from 0.1 percent by weight to 1.0 percent by weight.

Surfynol-type surfactants (ethoxylated alkynes), in particular Surfynol 465 (available from Air Products and Chemicals, Allentown, USA); Tergitol-type surfactants (ethoxylated alcohols, available from Dow Chemical Company, Midland, USA) and Olin 10 G (available from Olin Corporation, Norwalk, USA) are examples of nonionic surfactants.

Aerosol TO (available from Cytec Industries, West Paterson, USA); Triton X-200 (available from Dow Chemical Company, Midland, USA) and Niaproof 04 (available from Niacet Corporation, Niagara Falls, USA) are examples of nonionic surfactants.

The inks according to the invention further contain biocides in amounts up to 0.5 percent by weight relative to the total weight of the inks, preferentially in amounts from 0.1 percent by weight to 0.3 percent by weight. These biocides are essential ingredients, because they prevent the degradation of the inks by bacteria, yeasts and moulds, especially in open systems. They determine the shelf live, the transport properties and the storage properties of the inks. Examples of such biocides are Mergal 10 K N, available from Troy Chemical Company, Florham Park, USA, and Proxel GXL, available from Avecia, Manchester, Great Britain.

Each of the yellow ink, the magenta ink, the cyan ink and the black ink of the ink sets according to the invention comprise the dyes in amounts from 0.1 percent by weight to 10 percent by weight relative to the total weight of each ink. Preferred are amounts from 2 percent by weight to 6 percent by weight relative to the total weight of each ink.

The components (with the exception of water) used in the yellow inks according to the invention are listed in Table 1, relative to the total weight of the ink.

TABLE 1

| Component | Percent by weight |
|---|---|
| Ethylene glycol | 6.0 |
| Propylene glycol | 3.0 |
| N-methylpyrrolidone | 3.0 |
| Triethanolamine | 2.0 |
| Olin 10G (Surfactant) | 0.1 |
| Surfynol 465 (Surfactant) | 0.2 |
| Mergal K 10 N (Biocide) | 0.1 |

The composition of a typical magenta ink of an ink set according to the invention is listed in Table 2.

TABLE 2

| Component | Percent by weight |
|---|---|
| Ethylene glycol | 6.0 |
| Propylene glycol | 3.0 |
| N-methylpyrrolidone | 3.0 |
| Triethanolamine | 2.0 |
| Olin 10G (Surfactant) | 0.1 |
| Surfynol 465 (Surfactant) | 0.2 |
| Mergal K 10 N (Biocide) | 0.1 |
| Dye "Magenta 2" | 2.5 |
| Water | 83.1 |

The dye "Magenta 2" may also be replaced by the dyes "Magenta 1", "Magenta 3" or a mixture of these magenta dyes.

The composition of a typical cyan ink of an ink set according to the invention is listed in Table 3.

TABLE 3

| Component | Percent by weight |
|---|---|
| Ethylene glycol | 6.0 |
| Propylene glycol | 3.0 |
| N-methylpyrrolidone | 3.0 |
| Triethanolamine | 2.0 |
| Olin 10G (Surfactant) | 0.1 |
| Surfynol 465 (Surfactant) | 0.2 |

TABLE 3-continued

| Component | Percent by weight |
|---|---|
| Mergal K 10 N (Biocide) | 0.1 |
| Dye "Direct Blue 199" | 3.0 |
| Water | 82.6 |

The cyan dye Direct Blue 199 may be replaced by other suitable copper phthalocyanine dyes or by mixtures of copper phthalocyanine dyes.

The composition of a typical black ink of an ink set according to the invention is listed in Table 4.

TABLE 4

| Component | Percent by weight |
|---|---|
| Ethylene glycol | 6.0 |
| Propylene glycol | 3.0 |
| N-methylpyrrolidone | 3.0 |
| Olin 10G (Surfactant) | 0.1 |
| Surfynol 465 (Surfactant) | 0.2 |
| Mergal K 10 N (Biocide) | 0.1 |
| Dye "Black 1" | 4.5 |
| Water | 83.1 |

The dye "Black 21 may be replaced by the dyes "Black 2", Reactive Black 31 or a mixture of these black dyes.

The present invention will be illustrated in more detail by the following examples without limiting the scope of the invention in any way.

Image Preparation

For the determination of color coordinates, yellow wedges with 10 steps, wherein the number of droplets decreases linearly from step 1 (100%) to step 10 (10%), were printed with an ink jet printer Canon BJC 8500 onto the recording sheets IJP1.GP7 and DTN.GP9, both available from ILFORD Imaging Switzerland GmbH, Fribourg, Switzerland, using inks according to the invention. IJP1.GP7 is a polymer based recording sheet for ink jet printing, DTN.GP9 is a nanoporous recording sheet.

For the determination of light stability, yellow patches with 95% ink load were printed onto the recording sheets IJP1.GP7 and DTN.GP9.

For the determination of dye diffusion, squares of 1 $cm^2$ containing a finely graded grid were printed, wherein the squares of this grid had a length of 8 pixels and the lines a width of 2 pixels. The printed samples were dried for 24 hours in air of 59% relative humidity. Afterwards dye diffusion was determined in the printed samples.

Tests

The following properties were determined on the recording sheets printed with the yellow inks according to the invention:

Light Stability

The printed samples were irradiated in an ATLAS Ci35A Weather-O-Meter® with a 6500 W Xenon lamp until a total illumination of 10 kJoule/$cm^2$ was reached. The density difference of the samples before and after irradiation is an indication for the light stability of the dyes.

Color Coordinates

The color coordinates (L*a*b*-values) were measured on printed samples using a Spectrolino™ spectrometer, available from Gretag AG, Regensdorf, Switzerland. Yellow dyes showing a reddish tint have a positive value of a*, those showing a greenish tint a negative value of a*.

Dye Diffusion

The optical density of the dyed squares was measured using a densitometer Spectrolino™, available from Gretag Macbeth, Regensdorf, Switzerland. The printed samples were then stored for 7 days in a climatic test cabinet of Heräus at a temperature of 40° C. and relative humidity of 80%. After this storage time the samples were remeasured. The percent density differences before and after storage are an indication of the amount of dye diffusion. A density increase corresponds to dye diffusion, because the unprinted regions of the grid are colored by the diffusing dye. Therefore, the measured integral density increases.

The present invention will be illustrated in more detail by the following examples without limiting the scope of the invention in any way.

EXAMPLES

Example 1

The components (with the exception of the dyes) used in the yellow inks are listed in Table 5, relative to the total weight of the ink.

TABLE 5

| Component | Percent by weight |
| --- | --- |
| Ethylene glycol | 6.0 |
| Propylene glycol | 3.0 |
| N-methylpyrrolidone | 3.0 |
| Triethanolamine | 2.0 |
| Olin 10G (Surfactant) | 0.1 |
| Surfynol 465 (Surfactant) | 0.2 |
| Mergal K 10 N (Biocide) | 0.1 |

Olin 10G is available from Olin Corporation, Norwalk, USA, Surfynol 465 is available from Air Products and Chemicals, Allentown, USA, and Mergal K 10 N is available from Troy Chemical Company, Florham Park, USA.

The mixing ratios of the yellow dyes used are listed in Table 6. The yellow ink Y-1.1 comprises only the yellow dye "Yellow G-1", the yellow ink Y-1.5 comprises only the yellow dye "Yellow R-1". The yellow inks Y-1.2, Y-1.3 and Y-1.4 each comprise a mixture of the two dyes.

TABLE 6

| Ink | Part of Dye "Yellow G-1" (percent by weight) | Part of Dye "Yellow R-1" (percent by weight) |
| --- | --- | --- |
| Y-1.1 | 100 | 0 |
| Y-1.2 | 75 | 25 |
| Y-1.3 | 50 | 50 |
| Y-1.4 | 25 | 75 |
| Y-1.5 | 0 | 100 |

In the comparative ink Y-C-1, the dye Acid Yellow 23 was used in place of the dye "Yellow G-1" of ink Y-1.1. Its quantity was adjusted in such a way that approximately the same printed density was obtained.

Example 2

The dye "Yellow R-1" in the inks of example 1 was replaced by the dye "Yellow R-2".

The mixing ratios of the yellow dyes used are listed in Table 7. The yellow ink Y-2.1 comprises only the yellow dye "Yellow G-1", the yellow ink Y-2.5 comprises only the yellow dye "Yellow R-2". The yellow inks Y-2.2, Y-2.3 and Y-2.4 each comprise a mixture of the two dyes.

TABLE 7

| Ink | Part of Dye "Yellow G-1" (percent by weight) | Part of Dye "Yellow R-2" (percent by weight) |
| --- | --- | --- |
| Y-2.1 | 100 | 0 |
| Y-2.2 | 75 | 25 |
| Y-2.3 | 50 | 50 |
| Y-2.4 | 25 | 75 |
| Y-2.5 | 0 | 100 |

Results

The measured values of L*a*b* at maximum density of the inks of example 1 and of the comparative ink printed onto the recording sheet IJP1.GP7 are listed in Table 8.

TABLE 8

| Ink | L* | a* | b* |
| --- | --- | --- | --- |
| Y-1.1 | 91.80 | −16.01 | 100.89 |
| Y-1.2 | 90.21 | −10.49 | 97.17 |
| Y-1.3 | 88.58 | −5.10 | 97.69 |
| Y-1.4 | 87.46 | −1.46 | 95.87 |
| Y-1.5 | 86.66 | 1.17 | 92.89 |
| Y-C-1 | 90.89 | −9.87 | 109.31 |

The measured values of L*a*b* at maximum density of the inks of Example 1 and of the comparative ink printed onto the recording sheet DTN.GP9 are listed in Table 9.

TABLE 9

| Ink | L* | a* | b* |
| --- | --- | --- | --- |
| Y-1.1 | 91.64 | −17.84 | 98.74 |
| Y-1.2 | 90.46 | −13.84 | 95.92 |
| Y-1.3 | 89.10 | −9.52 | 95.83 |
| Y-1.4 | 88.19 | −6.53 | 93.17 |
| Y-1.5 | 87.45 | −3.72 | 90.62 |
| Y-C-1 | 89.71 | −8.94 | 103.18 |

The results in Tables 8 and 9 show that the hue a* of the dye Acid Yellow may be reproduced well on both recording sheets by a suitable mixture of the dyes "Yellow G-1" and "Yellow R-1".

The measured values of L*a*b* at maximum density of the inks of Example 2 and of the comparative ink printed onto the recording sheet IJP1.GP7 are listed in Table 10.

TABLE 10

| Ink | L* | a* | b* |
| --- | --- | --- | --- |
| Y-2.1 | 91.80 | −16.01 | 100.89 |
| Y-2.2 | 90.87 | −12.10 | 96.34 |
| Y-2.3 | 90.17 | −8.94 | 95.43 |
| Y-2.4 | 89.32 | −5.92 | 93.29 |
| Y-2.5 | 88.33 | −2.84 | 91.99 |
| Y-C-1 | 90.89 | −9.87 | 109.31 |

The measured values of L*a*b* at maximum density of the inks of example 2 and of the comparative ink printed onto the recording sheet DTN.GP9 are listed in Table 11.

TABLE 11

| Ink | L* | a* | b* |
|---|---|---|---|
| Y-2.1 | 91.64 | −17.84 | 98.74 |
| Y-2.2 | 91.07 | −15.16 | 94.92 |
| Y-2.3 | 90.23 | −12.35 | 93.63 |
| Y-2.4 | 89.50 | −9.61 | 91.42 |
| Y-2.5 | 88.64 | −6.88 | 89.26 |
| Y-C-1 | 89.71 | −8.94 | 103.18 |

The results in Tables 10 and 11 show that the hue a* of the dye Acid Yellow may be reproduced well on both recording sheets by a suitable mixture of the dyes "Yellow G-1" and "Yellow R-2".

The results of light stability testing of the inks of Example 1 and of the comparative ink printed onto the recording sheets IJP1.GP7 and DTN.GP9 are listed in Table 12.

TABLE 12

| | Density loss in percent | |
|---|---|---|
| Ink | Recording sheet IJP1.GP7 | Recording sheet DTN.GP9 |
| Y-1.1 | 16 | 15 |
| Y-1.2 | 14 | 13 |
| Y-1.3 | 10 | 11 |
| Y-1.4 | 6 | 11 |
| Y-1.5 | 4 | 9 |
| Y-C-1 | 53 | 39 |

The results in Table 12 show that the light stability of yellow patches containing the yellow dyes "Yellow G-1" and "Yellow R-1" either alone or as mixtures is considerably improved in comparison with yellow patches containing the yellow dye Acid Yellow 23 used in proofing hitherto.

A density loss of 25% corresponds to a life expectancy of 5 years under ambient light conditions (500 lux).

The results of light stability testing of the inks of Example 2 and of the comparative ink printed onto the recording sheets IJP1.GP7 and DTN.GP9 are listed in Table 13.

TABLE 13

| | Density loss in percent | |
|---|---|---|
| Ink | Recording sheet IJP1.GP7 | Recording sheet DTN.GP9 |
| Y-2.1 | 16 | 15 |
| Y-2.2 | 15 | 12 |
| Y-2.3 | 11 | 11 |
| Y-2.4 | 7 | 10 |
| Y-2.5 | 5 | 6 |
| Y-C-1 | 53 | 39 |

The results in Table 13 show that the light stability of yellow patches containing the yellow dyes "Yellow G-1" and "Yellow R-2" either alone or as mixtures is considerably improved in comparison with yellow patches containing the yellow dye Acid Yellow 23 used in proofing hitherto.

The results of testing of dye diffusion of the inks Y-1.1, Y-1.5 and Y-2.5 and of the comparative ink Y-C-1 printed onto the recording sheets IJP1.GP7 and DTN.GP9 are listed in Table 14.

TABLE 14

| | Density increase in percent | |
|---|---|---|
| Ink | Recording sheet IJP1.GP7 | Recording sheet DTN.GP9 |
| Y-1.1 | 8 | 4 |
| Y-1.5 | 6 | 5 |
| Y-2.5 | 7 | 3 |
| Y-C-1 | 20 | 27 |

The results in Table 14 show that the diffusion fastness of the three dyes "Yellow R-1", "Yellow R-1" and "Yellow G-1" and of their mixtures is considerably better than that of the dye Acid Yellow 23 used in proofing hitherto.

Finally, variations from the examples given herein are possible in view of the above disclosure. Therefore, although the invention has been described with reference to certain preferred embodiments, it will be appreciated that other dyes and ink sets may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. Ink set for ink jet printing comprised of at least one yellow ink, at least one magenta ink, at least one cyan ink and at least one black ink, wherein the yellow ink contains a mixture of at least one yellow dye with reddish hue of formula (I),

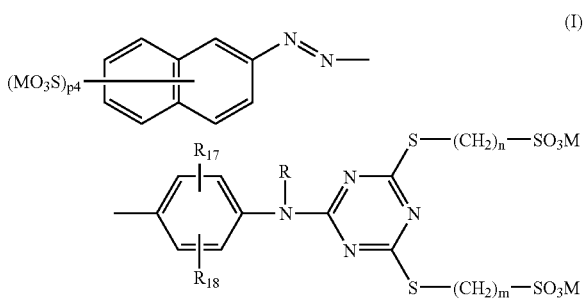

R represents hydrogen or alkyl having from 1 to 6 carbon atoms;

M represents hydrogen or a metal atom or ammonium optionally substituted by alkyl, alkoxyalkyl or hydroxyalkyl;

$R_{17}$, $R_{18}$ independently represent hydrogen, alkyl or alkoxy each having from 1 to 3 carbon atoms;

$p_4$ is from 1 to 3 and the sulfo group is in position 1, 4, 5, 6, 7 or 8 in the case where $p_4$ is equal to 1; the sulfo groups are in positions 4 and 8, 5 and 7, 6 and 8 or 1 and 5, in the case where $p_4$ is equal to 2; or the sulfo groups are in positions 3, 6 and 8 or 4, 6 and 8 in the case where $p_4$ is equal to 3;

n, m are each independently from 2 to 6, and at least one yellow dye with greenish hue of formula (II),

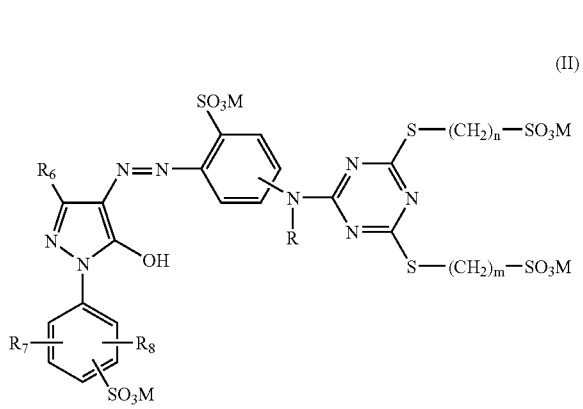

(II)

wherein

R represents hydrogen or alkyl having from 1 to 6 carbon atoms;

M represents hydrogen or a metal atom or ammonium optionally substituted by alkyl, alkoxyalkyl or hydroxyalkyl;

$R_6$ represents methyl or carboxy;

$R_7$, $R_8$ independently represent hydrogen, chloro, bromo or methyl and n, m are each independently from 2 to 6; and wherein the magenta ink ink contains the dye "Magenta 1" of formula

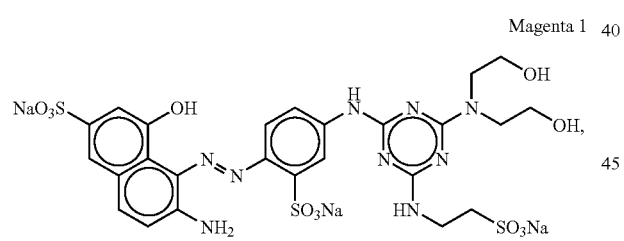

Magenta 1 or the dye "Magenta 2" of formula

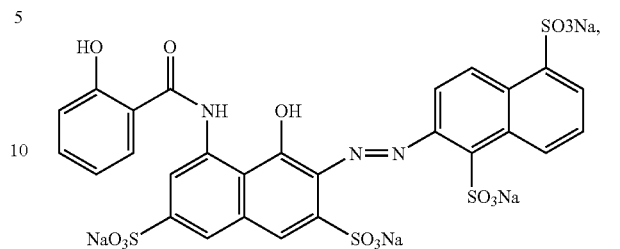

Magenta 2 or the dye "Magenta 3" of formula

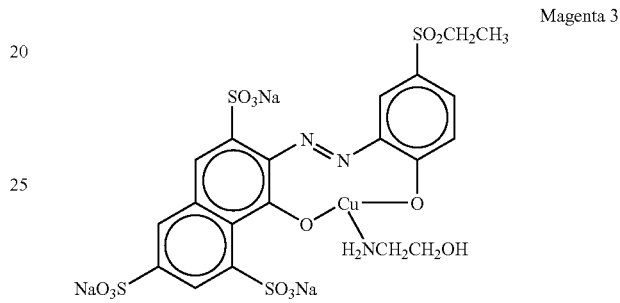

Magenta 3 or a mixture of these dyes.

2. Ink set according to claim 1, wherein the ratio of the yellow dyes with reddish hue to the yellow dyes with greenish hue is from 1:99 by weight to 99:1 by weight.

3. Ink set according to claim 1, wherein said yellow ink contains the dye with reddish hue "Yellow R-1" of formula

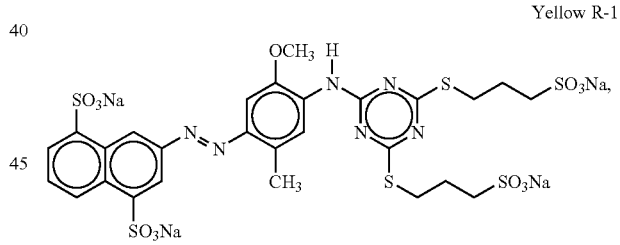

Yellow R-1 or the yellow dye "Yellow R-2" of formula

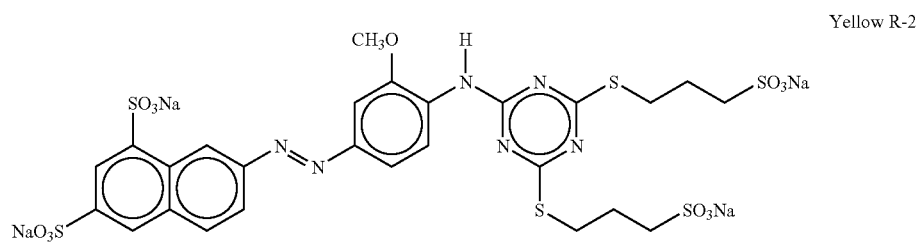

Yellow R-2 or a mixture of these two dyes and the yellow dye with greenish hue "Yellow G-1" of formula Yellow G-1

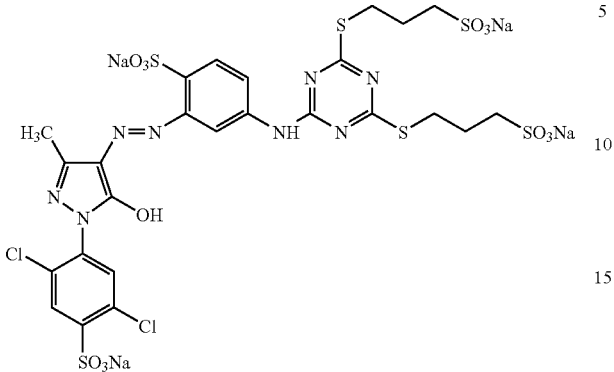

or the dye "Yellow G-2" of formula

Yellow G-2

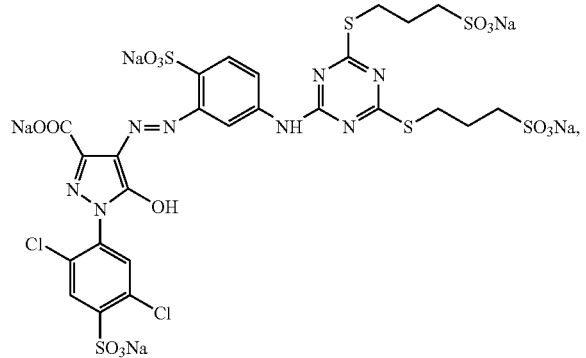

or a mixture of these dyes.

4. Ink set according to claim 1, wherein said cyan ink contains at least one copper phthalocyanine dye.

5. Ink set according to claim 4, wherein the cyan dye is "Direct Blue 199" of formula Direct Blue 199

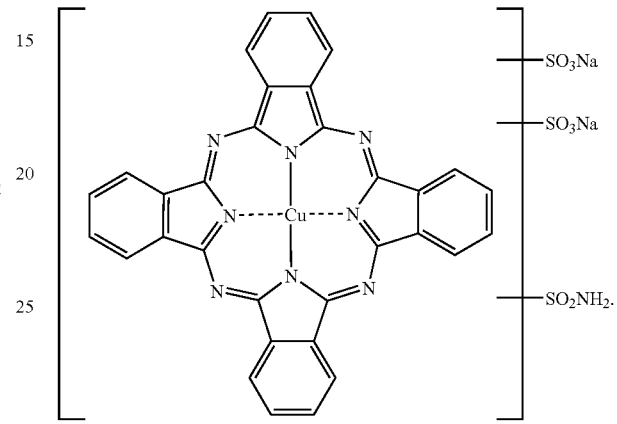

6. Ink set according to claim 1, wherein said black ink contains the dye "Black 1" of formula Black 1

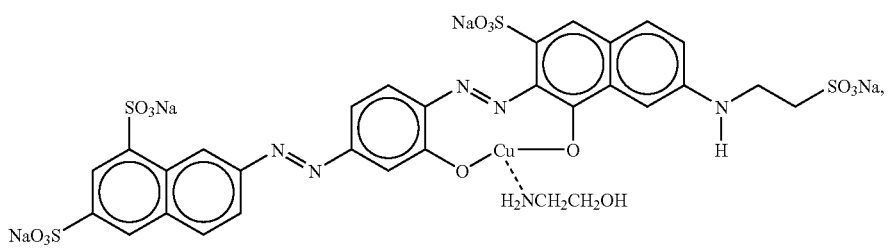

or the dye "Black 2" of formula

Black 2

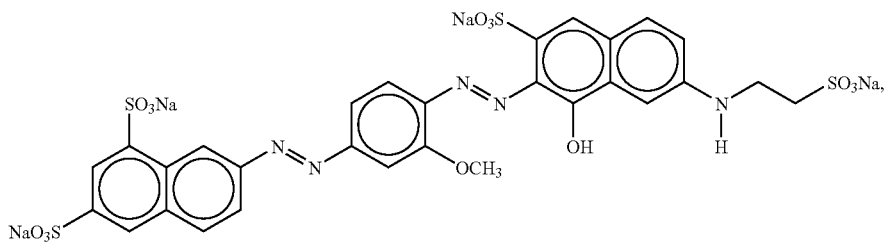

or the dye "Reactive Black 31" of formula

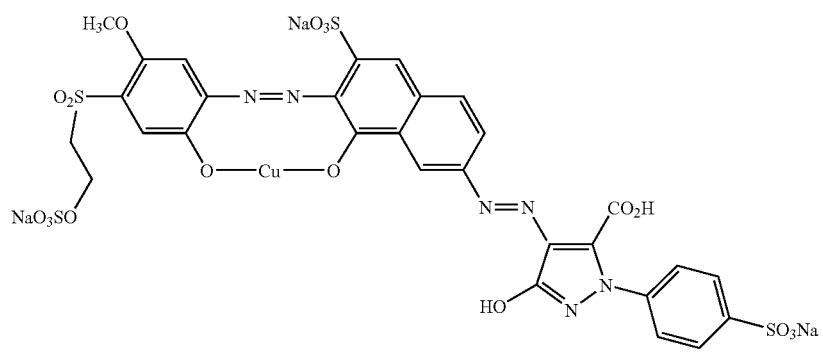

Reactive Black 31 or a mixture of these dyes.

7. Ink set according to claim 1, wherein said yellow ink, said magenta ink, said cyan ink and said black ink each contain dyes in amounts of from 0.1 percent by weight to 10 percent by weight relative to the total weight of each ink.

8. Ink set according to claim 1, wherein said yellow ink, said magenta ink, said cyan ink and said black ink each contain dyes in amounts of from 2 percent by weight to 6 percent by weight relative to the total weight of each ink.

9. Ink set for ink jet printing comprised of at least one yellow ink, at least one magenta ink, at least one cyan ink and at least one black ink, wherein said yellow ink contains a dye with reddish hue "Yellow R-1" of formula

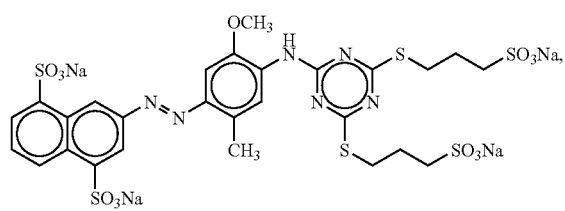

Yellow R-1 or the yellow dye "Yellow R-2" of formula

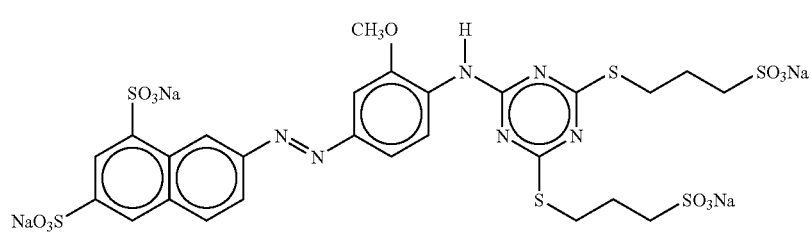

Yellow R-2 or a mixture of these two dyes and
a yellow dye with greenish hue "Yellow G-1" of formula

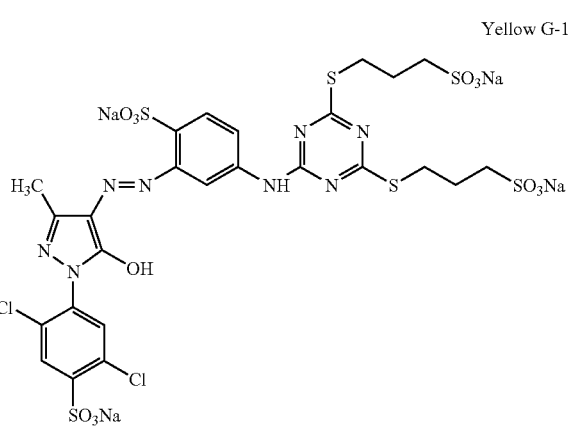

Yellow G-1 or the dye "Yellow G-2" of formula

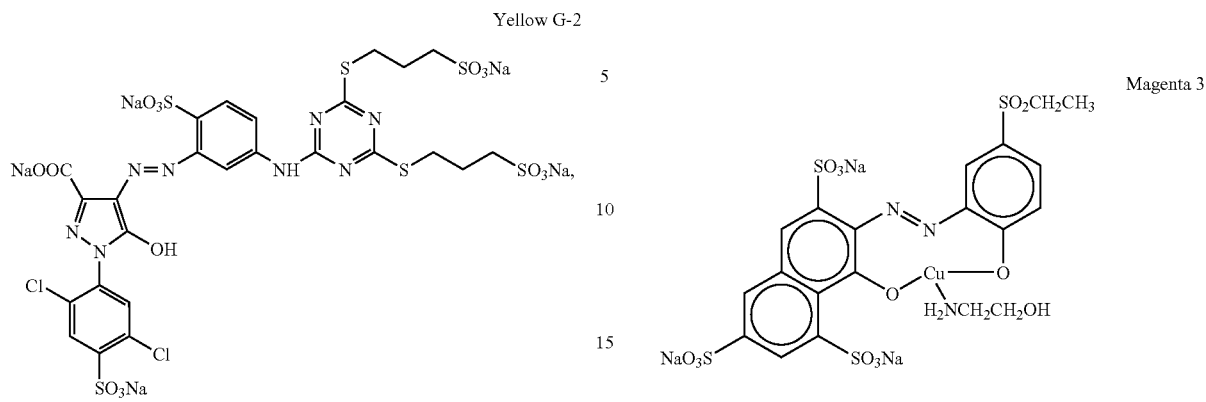
or a mixture of these dyes;
wherein said magenta ink contains a dye "Magenta 1" of formula
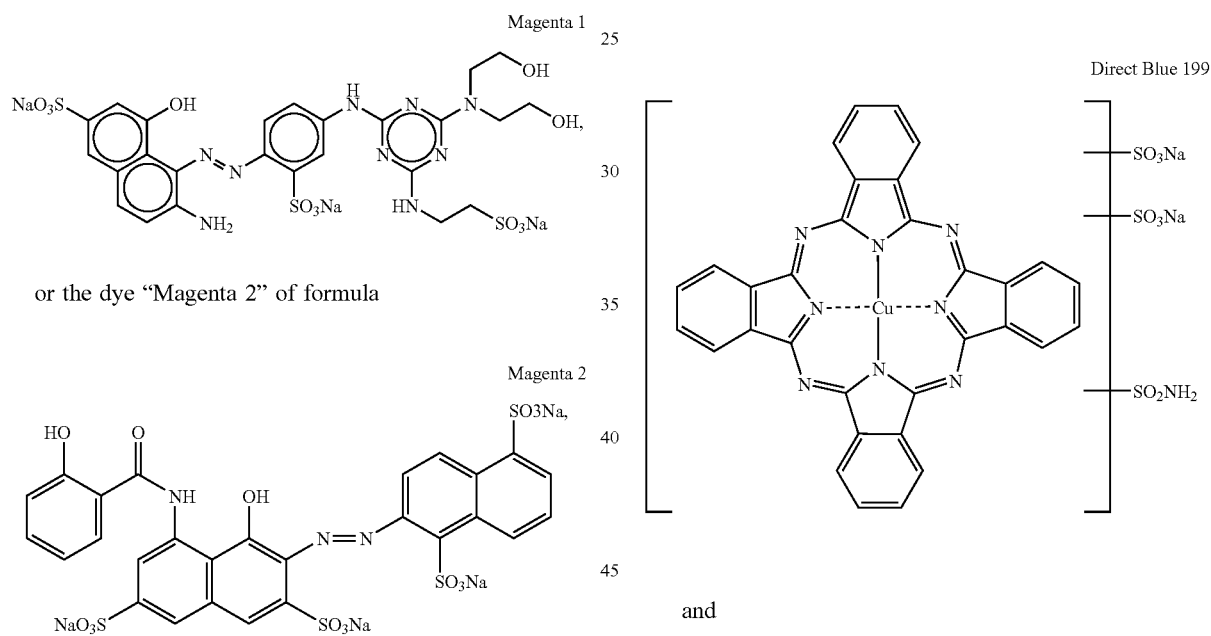
or the dye "Magenta 2" of formula
or the dye "Magenta 3" of formula
or a mixture of these dyes;
wherein said cyan ink contains the dye "Direct Blue 199" of formula
and
wherein said black ink contains the dye "Black 1" of formula
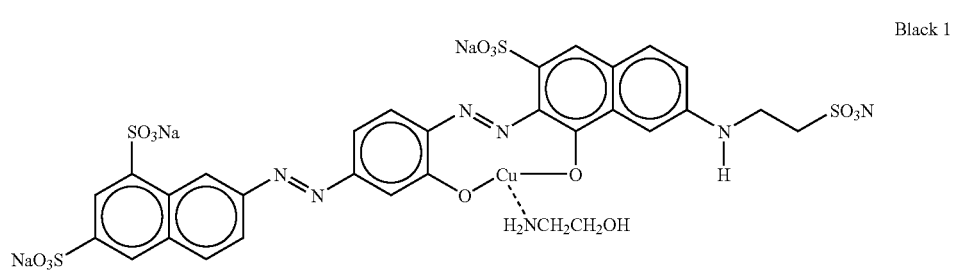

or the dye "Black 2" of formula
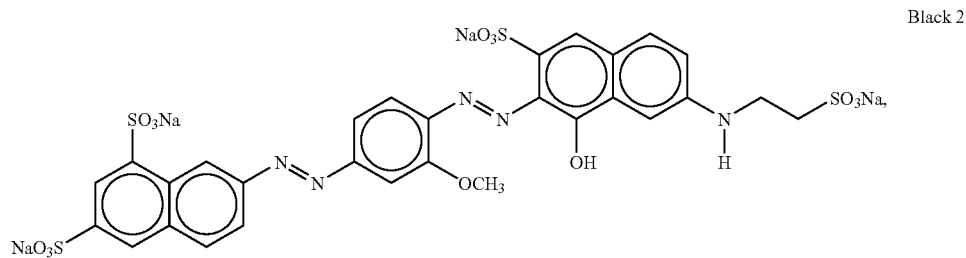
Black 2
or the dye "Reactive Black 31" of formula
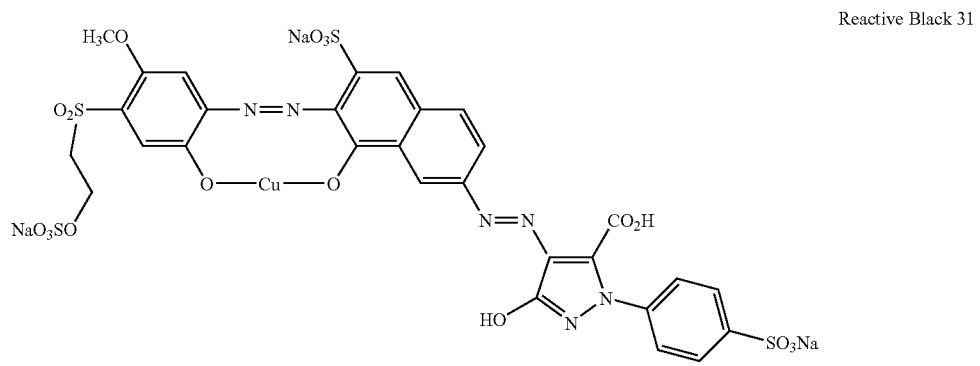
Reactive Black 31
or a mixture of these dyes.

UNITED STATES PATENT AND TRADEMARK OFFICE
CERTIFICATE OF CORRECTION

PATENT NO. : 7,273,520 B2  
APPLICATION NO. : 11/044281  
DATED : September 25, 2007  
INVENTOR(S) : Gremaud et al.

Page 1 of 1

It is certified that error appears in the above-identified patent and that said Letters Patent is hereby corrected as shown below:

In the specification at:

Col. 7 line 5 delete
"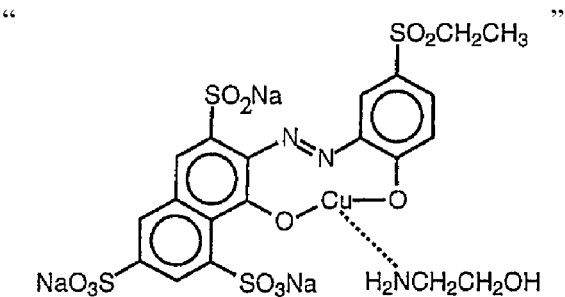"

And insert
--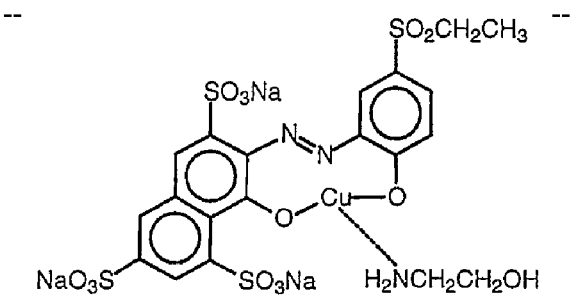--

Col. 11 line 1 delete "TO" and insert --OT--.

Signed and Sealed this

Eighteenth Day of December, 2007

JON W. DUDAS  
*Director of the United States Patent and Trademark Office*